US009686607B1

(12) United States Patent
Wu et al.

(10) Patent No.: US 9,686,607 B1
(45) Date of Patent: Jun. 20, 2017

(54) AUDIO PROCESSING DEVICES WITH PORT OUTPUT CIRCUITS CONTROLLED BY PC BEEP SIGNAL ACTIVITY

(75) Inventors: Qichang Wu, Shanghai (CN); Daniel Bogard, Austin, TX (US); Shun Qian, Shanghai (CN)

(73) Assignee: Tempo Semiconductor, Inc., Austin, TX (US)

( * ) Notice: Subject to any disclaimer, the term of this patent is extended or adjusted under 35 U.S.C. 154(b) by 58 days.

(21) Appl. No.: 13/409,776

(22) Filed: Mar. 1, 2012

(51) Int. Cl.
*G06F 3/00* (2006.01)
*H04R 29/00* (2006.01)
*H04R 3/00* (2006.01)
*H04R 3/02* (2006.01)

(52) U.S. Cl.
CPC .................................... *H04R 3/02* (2013.01)

(58) Field of Classification Search
None
See application file for complete search history.

(56) References Cited

U.S. PATENT DOCUMENTS 8,325,940 B2 * 12/2012 Larsen et al. ................ 381/94.5
2003/0091069 A1 * 5/2003 Kraemer et al. .............. 370/487

OTHER PUBLICATIONS

*Single Chip PC Audio System, CODEC + Stereo Speaker Amplifier + Capless HP + LDO*, 92HD87; IDT Integrated Device Technology, Inc, V 0.995; Nov. 2011 (pp. 1, 13-15, 22-27, 40 and 198).

* cited by examiner

*Primary Examiner* — Kris Rhu
(74) *Attorney, Agent, or Firm* — Jeffrey Van Myers

(57) ABSTRACT

An audio processing integrated circuit chip, such as codec chip, includes at least one port output circuit configured to generate an audio signal to drive an external audio device and a PC beep circuit configured to receive a PC beep signal and to apply the received PC beep signal to an input of the at least one port output circuit. The chip further includes a control circuit configured to detect activity of the PC beep signal and to enable and/or disable the at least one port output circuit responsive to the detected activity.

12 Claims, 5 Drawing Sheets

AUDIO PROCESSING DEVICES WITH PORT OUTPUT CIRCUITS CONTROLLED BY PC BEEP SIGNAL ACTIVITY

FIELD

The inventive subject matter relates to integrated circuit devices and, more particularly, to audio processing integrated circuit chips.

BACKGROUND

Audio processing integrated circuit chips, such as codec (coder/decoder) chips are commonly used in consumer electronic devices, such as desktop computers, notebook computers, tablets and smart phones. For example, desktop and notebook computers typically include a codec chip that is used to process audio signals transmitted to and received from external audio devices, such as microphones and headphones. Such a codec chip may be configured to interface with a digital bus connected to the computer's CPU chip set, and includes signal processing circuitry, such as analog to digital converters (ADCs), digital-to-analog converters (DACs), filters, mixers and multiplexers. The bus communications of such codec chips typically conform to a standardized protocol, such that described by the Intel® High Definition Audio Specification.

Portable devices, such as notebook computers, are typically constrained by battery capacity. Thus, it is generally desirable for the electronic circuitry used in a portable device to conserve energy. In codec chips, power conservation may be achieved by selective activation of power supplies to circuits such as DACs and ADCs, and by reducing bias voltages provided to output circuits, such as port amplifier circuits that are used to drive external headphones and speakers.

CPU chipsets typically include the capability to generate audio signals that may be used for diagnostic and other purposes. For example, desktop and notebook chip sets typically generate a PC beep signal that may be used to signal boot up, reset, fault or other operating system conditions. This PC beep signal may be an analog signal, a 1-bit digital audio signal or a pulse-width modulated (PWM) signal (analog or digital derived). Conventional codec chips may route such a PC beep signal to one or more port amplifiers or other output circuits of the codec chip. Accordingly, even when the codec chip is in a low power mode, it maintains one or more port output circuits in an enabled state so that the PC beep can be transmitted to speakers, headphones or other devices coupled to the codec chip.

SUMMARY

In some embodiments of the inventive subject matter, an audio processing integrated circuit chip includes at least one port output circuit configured to drive an external audio device and a PC beep circuit configured to receive a PC beep signal and to drive the at least one port output circuit responsive to the PC beep signal. The chip further includes a control circuit configured to detect activity of the PC beep signal and to enable and/or disable the at least one port output circuit responsive to the detected activity. For example, the control circuit may be configured to enable and/or disable the at least one port output circuit responsive to the detected activity meeting a criterion.

In some embodiments, the control circuit may include a beep signal sensor circuit configured to compare the PC beep signal to a reference signal to thereby generate a beep sense signal, an activity detector circuit configured to monitor the beep sense signal and to responsively generate a beep activity detection signal and a port output control circuit configured to control the at least on port output circuit responsive to the beep activity detection signal. The activity detector circuit may be configured, for example, to determine a duration for which the beep sense signal remains in a given state and to responsively generate the beep activity detection signal.

In further embodiments, the control circuit may be configured to operate responsive to the link reset signal. The control circuit may also be configured to disable the at least one port output circuit for a time interval responsive to power up of the audio processing chip.

Additional embodiments provide an audio codec integrated circuit chip including a digital bus interface circuit configured to receive digital audio signals over a digital communications bus, a plurality of audio ports configured to be coupled to external audio devices, audio processing circuitry configured to process the digital audio signals received by the digital bus interface circuit to produce processed audio signals and a plurality of port output circuits configured to generate external audio signals at the audio ports responsive to the processed audio signals. The codec chip also includes a PC beep circuit configured to receive a PC beep signal and to drive at least one of the port output circuits responsive to the PC beep signal. The codec chip further includes a control circuit configured to detect activity of the PC beep signal and to enable and/or disable the at least one of the port output circuits responsive to the detected activity.

In further embodiments of the inventive subject matter, an audio processing integrated circuit chip includes at least one port output circuit configured to generate an audio signal to drive an external audio device and a PC beep circuit configured to receive a PC beep signal and to drive the at least one port output circuit responsive to the PC beep signal. The chip further includes a control circuit configured to determine whether activity at an input of the PC beep circuit meets a criterion and to responsively control power consumption by the audio processing chip.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
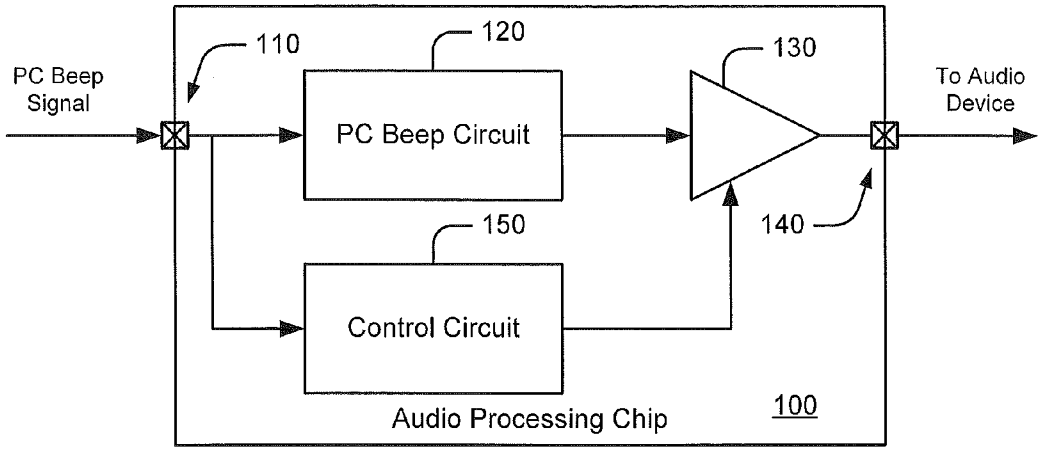
FIG. 1 illustrates an audio processing chip according to some embodiments of the inventive subject matter.

Embodiments of the inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like items throughout.

It will be understood that, although the terms first, second, etc. may be used herein to describe various items, these items should not be limited by these terms. These terms are only used to distinguish one item from another. For example, a first item could be termed a second item, and, similarly, a second item could be termed a first item, without departing from the scope of the inventive subject matter. As used herein, the term “and/or” includes any and all combinations of one or more of the associated listed items.

It will be understood that when an item is referred to as being “connected” or “coupled” to another item, it can be directly connected or coupled to the other item or intervening items may be present. In contrast, when an item is referred to as being “directly connected” or “directly coupled” to another item, there are no intervening items present. Throughout the specification, like reference numerals in the drawings denote like items.

The terminology used herein is for the purpose of describing particular embodiments only and is not intended to be limiting of the inventive subject matter. As used herein, the singular forms “a”, “an” and “the” are intended to include the plural forms as well, unless the context clearly indicates otherwise. It will be further understood that the terms “comprises” “comprising,” “includes” and/or “including” when used herein, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term “plurality” is used herein to refer to two or more of the referenced item.

Some embodiments of the inventive subject matter arise from a realization that, because of the typical duration of PC beep signals, components of a codec chip that are particularly power-consuming, such as cap-less headphone port amplifiers and bridge tied load (BTL) port amplifiers, may be activated upon demand to transmit PC beep signals without significantly impacting the information content of such signals. Other types of port output circuits, such as output circuits conforming to audio interfaces such as S/P-DIF (Sony/Phillips digital interconnect format), I2S (Inter-IC Sound or Integrated Interchip Sound), HDMI (High Definition Multimedia Interface), and the like, may also be similarly controlled.

FIG. 1 illustrates an audio integrated circuit chip 100 according to some embodiments of the inventive subject matter. The chip 100 may be, for example, an audio codec chip configured to provide an interface between a computer chipset and external audio devices, such as headphones, speakers, microphones or other devices that receive analog and/or digital audio signals. The chip 100 may also be, for an example, a chip that incorporates codec or other audio functions with circuitry that provides other functions, such as other peripheral device interface functions.

The chip 100 includes an input (e.g., a pin, bonding contact, or the like) configured to receive a PC beep signal. The PC beep signal may be provided, for example, by a computer chip set of a desktop or notebook computer. It will be understood that such a PC beep signal may include an analog signal (continuously time-varying) and/or a digital signal (e.g., 1-bit digital audio signals or PWM signals). The chip 100 also includes a PC beep signal processing circuit 120 which is configured to receive the PC beep signal and to convey it, perhaps with intermediate processing (e.g., amplification, filtering, mixing or other signal processing) to the input of a port output circuit 130 of the chip 100. The port output circuit 130 is configured to drive an external device coupled to the chip at an output 140 (e.g., another pin, bonding contact, or the like). The port output circuit 130 may comprise, for example, an analog port amplifier circuit configured to drive an analog audio device (e.g., headphones), a digital port amplifier circuit (e.g., a digital class-D BTL speaker amplifier), and/or other output circuits that conform to audio interfaces, such as S/P-DIF, I2S, HDMI and the like.

The chip 100 further includes a control circuit 150 configured to control the port output circuit 130 responsive to the PC beep signal. For example, in some embodiments, the control circuit 150 may control power consumption by the port output circuit 130 (and, by extension, of the chip 100) responsive to detection of PC beep signal activity at the input 110. In some embodiments, this may involve using a comparator or other detection circuitry to detect voltage changes of the PC beep signal and enabling and disabling the port output circuit 130 based thereon, such that activation of the port output circuit 130 may be limited to times when the beep signal is active. Disabling and enabling of the port output circuit 130 may include, for example, removing or substantially diminishing a power supply voltage from the port output circuit 130.

Figure 2:
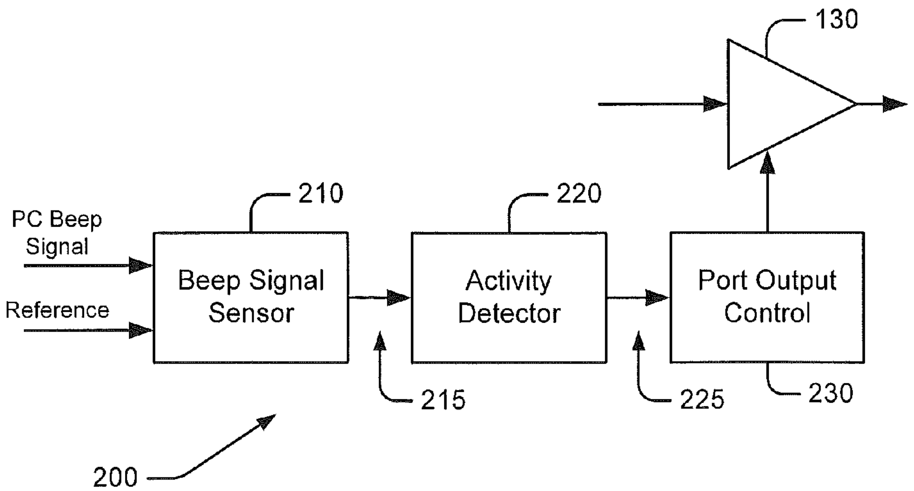
FIG. 2 illustrates a port control circuit according to some embodiments of the inventive subject matter.

FIG. 2 illustrates a control circuit 200 for controlling a port output circuit 130 according to further embodiments. The control circuit 200 includes a beep signal sensor circuit 210, which is configured to compare a PC beep signal to a reference signal to generate a beep sense signal 215. An activity detector circuit 220 is configured to receive the beep sense signal 215 and to determine whether the beep sense signal indicates activity and/or inactivity of the PC beep signal, e.g., to discriminate between an actual beep and transient noise. An activity detection signal 225 generated by the activity detector circuit 220 may be provided to a control circuit 230, which may, for example, control a power supply voltage applied to the port output circuit 130.

In some embodiments, the PC beep idle or inactive state may correspond to the absence of a signal transition in the PC beep signal. However, in some embodiments, the PC beep signal may have other states. For example, a PWM beep signal may have a 50% duty cycle at idle (beep not present) and greater or less than 50% duty cycle when active (beep present). In the case of such a signal, separate sense and activity detection (e.g., blocks 210, 220 of FIG. 2) may be particularly useful to discriminate between these two states. When a continuous analog PC beep signal is used, however, the beep signal sensor 210 and activity detector 220 may be redundant.

Figure 3:
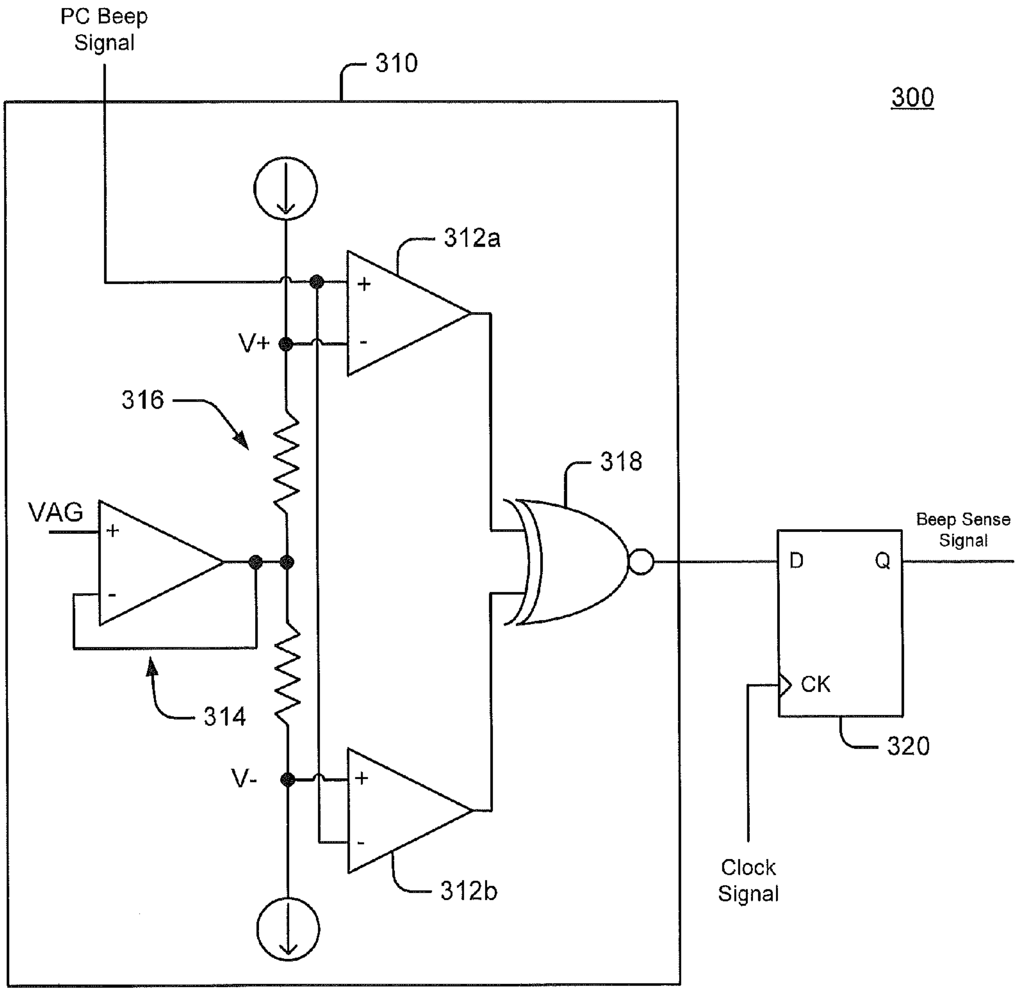
FIG. 3 illustrates a PC beep signal sensor circuit according to some embodiments of the inventive subject matter.

FIG. 3 illustrates an exemplary implementation of a beep signal sensor circuit 300 according to some embodiments.

The beep signal sensor circuit 300 includes a comparator circuit 310, which includes a window comparator implemented using first and second comparators 312*a*, 312*b* which compare a PC beep signal to positive and negative reference voltages V+, V− generated with respect to a virtual analog ground VAG using a voltage follower 314 and a divider network 316. An exclusive-NOR logic gate 318 receives the outputs of the comparators 312*a*, 312*a*, and responsively generates a digital signal indicative of whether the PC beep signal is within or outside of the window defined by the positive and negative reference voltages V+, V−. This signal is sampled by a flip-flop 320, which outputs a PC beep sense signal. It will be understood that FIG. 3 illustrates an example, and that other circuits could be used to generate a similar beep sense signal, including other types of comparator circuits and/or other logic circuits.

Figure 4:
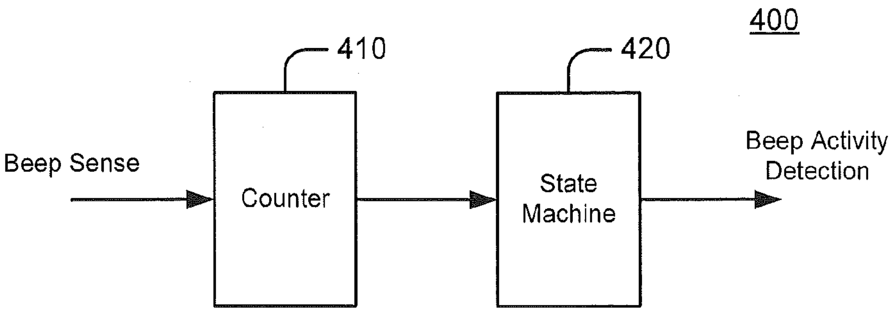
FIG. 4 illustrates a PC beep signal activity detection circuit according to some embodiments of the inventive subject matter.

FIG. 4 illustrates a beep signal activity detector circuit 400 according to some embodiments. The activity detector circuit 400 includes a counter 410, which receives a beep sense signal, such as one generated by the sensor circuit 300 of FIG. 3, and generates a count indicative of the duration for which the beep sense signal is in a particular state. A state machine circuit 420 generates a beep activity detection signal based on the counts generated by the counter circuit 410. The beep activity detection signal may indicate whether the PC beep signal input to the chip is active or inactive, i.e., whether or not a beep is present. It will be understood that the counter circuit 410 and/or the state machine circuit 420 may be implemented using any of a variety of different digital circuits, including special- or general-purpose processor circuits, programmable logic circuits and the like.

Figure 5:
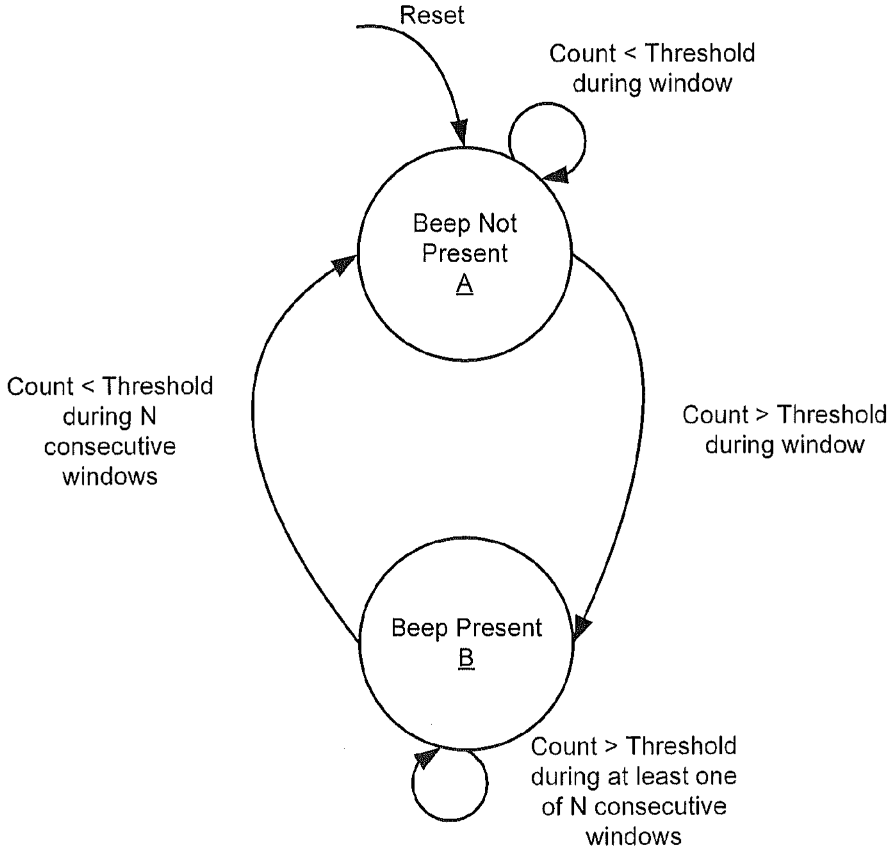
FIG. 5 illustrates state machine operations that may be performed by the circuit of FIG. 4.

FIG. 5 illustrates exemplary operations of such a state machine according to some embodiments. Upon a reset condition, e.g., a power-up reset and/or a commanded reset generated internally to the chip or by an external device coupled to the chip, the state machine transitions to a state A corresponding to a beep not being present. Assuming that a count triggered by a transition of the beep sense signal does not exceed a certain threshold number within predetermined time interval (e.g., 1 millisecond), the state machine remains in the “beep not present” state A. In this state, the beep activity detection signal may be driven to a state indicative of absence of a beep and thereby cause the control circuit to disable the port output circuit(s). Upon the count exceeding the threshold during a time window, however, the state machine transitions to a “beep present” state B. Based on this transition, the beep activity detection signal may be driven to a state indicating presence of an active PC beep, and the control circuit may responsively enable the port output circuit(s) such that the beep is passed to one or more external audio devices. Once the count falls below the threshold value for N consecutive windows, indicating termination of the beep, the state machine returns to the “beep not present” state B.

Figure 6:
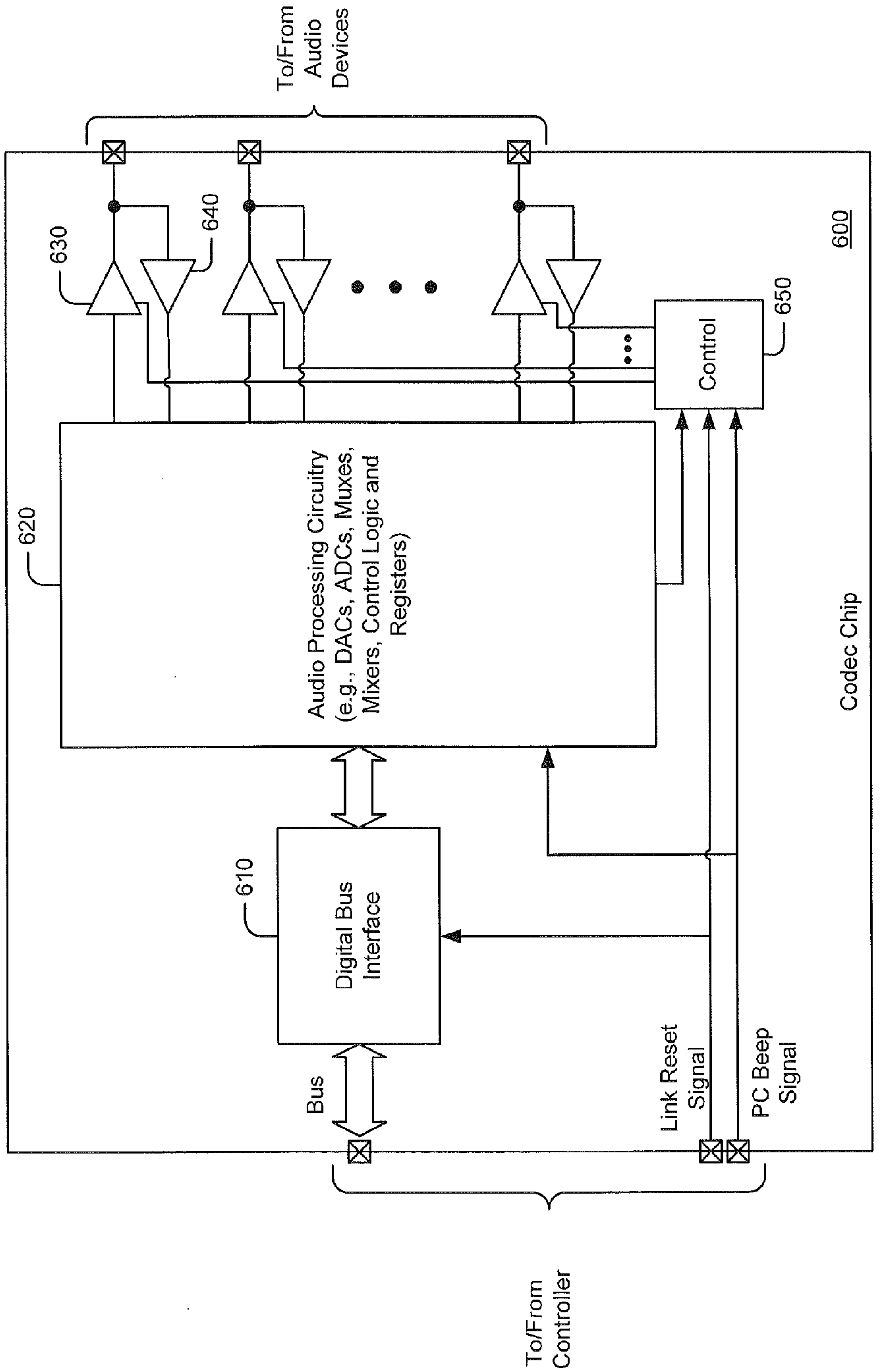
FIG. 6 illustrates a codec chip according to some embodiments of the inventive subject matter.

As noted above, the inventive subject matter may be embodied in a codec chip configured to provide an audio interface for a computer chip set. FIG. 6 illustrates such a codec chip 600 according to some embodiments. The codec chip 600 includes a digital audio bus interface circuit 610 configured to communicate with a controller chip of a chip set over a digital bus, such as a PCI bus. The communications of the bus interface circuit 610 may conform to, for example, the Intel® High Definition Audio Specification and/or some other standard. The chip 600 may also receive link reset and PC beep signals from the controller. In some embodiments, a link reset signal may not be present.

The chip 600 also includes audio processing circuitry 620, which is coupled to the digital bus interface circuit 610. The audio processing circuitry 620 may include, for example, ADCs, DACs, multiplexers, filters, mixers and related control logic and registers that control the operations thereof. This circuitry may be used, for example, to convert digital audio signals received via the digital bus interface circuit 610 into other analog and/or digital audio signals that may be routed to selected port output circuits 630, which may drive external audio devices via external pins, contact pads or the like. The PC beep signal may be routed to one or more of the port output circuits 630 (e.g., port amplifiers or other driver circuits) using, for example, multiplexers and mixers of the audio processing circuitry 620. For example, in some embodiments, the PC beep signal may be mixed with other signals generated by DACs or other circuitry in the audio processing circuitry 610 for input to one or more of the port output circuits 630. If the PC beep signal is an analog signal, for example, it may be mixed with other audio signals using an analog mixer before provision to one or more of the port output circuits 630. An analog PC beep signal may also be converted to a digital signal and mixed with other digital signals in the digital domain. The PC beep signal may also be used to derive an approximation thereof for output by one or more of the port output circuits 630.

The port output circuits 630 may be paired with corresponding port buffer circuits 640 that share ports with the port output circuits 630. The port buffer circuits 640 may receive analog and/or digital audio signals from external audio devices and these signals may be processed through multiplexers, mixers and ADCs of the audio processing circuitry 620. The resultant digital audio signals may be routed to the controller via the digital bus interface circuit 610.

As further shown, the PC beep signal may also be passed to a control circuit 650, which may operate to enable and/or disable selected ones of the port output circuits 630 based on detected PC beep signal activity. For example, when the codec chip 630 is placed in a low-power mode, the control circuit 650 may be configured to enable the port output circuits 630 only upon detection of a PC beep, thus reducing power dissipation associated with the port output circuits 630. Operation of the control circuit 650 may also be dependent on other signals, such as the link reset signal received from the controller and/or other control signals generated by the audio processing circuitry 620.

Figure 7:
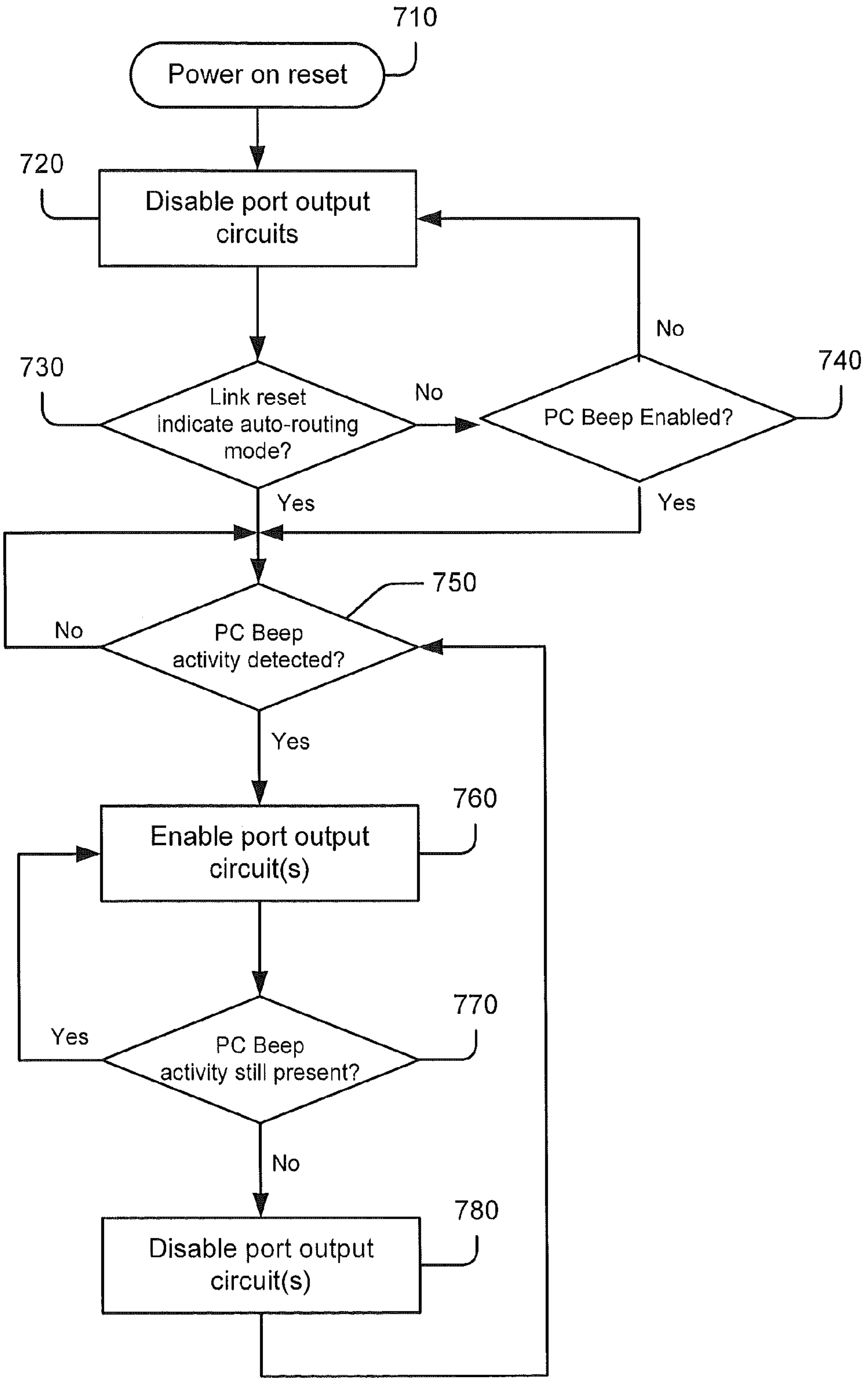
FIG. 7 is a flowchart illustrating operations of the codec chip of FIG. 6.

FIG. 7 illustrates exemplary operations of the codec chip 600 of FIG. 6 according to further embodiments. Upon a power up reset (block 710), the control circuit 620 may disable the port output circuits 630 of the codec chip 600 (block 720). This may be done, for example, to prevent pops and other audio effects associated with transient behavior of components of the codec chip 600 following power up. This disabled period may be maintained for a predetermined interval, for example, an interval sufficient to let the DACs and other components of the audio processing circuitry 620 stabilize.

After this initial period, the control circuit 650 may begin monitoring the PC beep signal for activity indicative of a PC beep. The reset signal provided by the controller may, for example, cause a PC beep auto-routing mode to be entered wherein the control circuit 650 begins to monitor PC beep signal activity with the intent to activate one or more of the port output circuits 630 when a PC beep is detected (blocks 730, 750). If the link reset signal does not command auto-routing, the port control circuit 650 may also determine whether PC beep routing has been “manually” commanded, e.g., whether a command has been passed from the controller that sets an appropriate control register to indicate that PC beeps should be routed to the port output circuits irrespective of the link reset status (blocks 740, 750). If neither condition is present, the port output circuits may remain disabled (block 720).

Assuming a link reset or manually commanded PC beep enabled state, once PC beep signal activity is detected, the control circuit 650 may enable one or more of the port output circuits 630 such that the beep is passed on to one or more external audio devices (block 760). The port output circuit(s) may be left enabled as long as the control circuit 650 detects the continued presence of a PC beep (blocks 770, 760). Once the control circuit 650 detects inactivity of the PC beep signal, it may disable the currently active port output circuit(s) and return to monitoring for the presence of a new PC beep (blocks 770, 780, 750).

It will be appreciated that the apparatus and operations described above with reference to FIGS. 6 and 7 are provided for purposes of illustration, and may be modified within the scope of the inventive subject matter. For example, operation of the control circuit 650 may be conditioned upon additional signals and/or circuit states. In some embodiments, similar functionality may be used in a device that does not provide bidirectional audio signal flows such as those shown in FIG. 6. The operations illustrated in FIG. 7 may also be modified and/or supplemented in various embodiments of the inventive subject matter.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An audio processing integrated circuit chip comprising:

at least one port output circuit configured to drive an external audio device;

a PC beep circuit configured to receive a PC beep signal and to drive the at least one port output circuit responsive to the PC beep signal; and a control circuit configured to detect activity of the PC beep signal and to enable and/or disable the at least one port output circuit responsive to the detected activity, the control circuit comprising:

a beep signal sensor circuit configured to compare the PC beep signal to a reference signal to thereby generate a beep sense signal;

an activity detector circuit configured to monitor the beep sense signal and to responsively generate a beep activity detection signal; and a port output control circuit configured to control the at least one port output circuit responsive to the beep activity detection signal.

2. The audio processing integrated circuit chip of claim 1, wherein the control circuit is configured to enable and/or disable the at least one port output circuit responsive to the detected activity meeting a criterion.

3. The audio processing integrated circuit chip of claim 1, wherein the activity detector circuit is configured to determine a duration for which the beep sense signal remains in a given state and to responsively generate the beep activity detection signal.

4. The audio processing integrated circuit chip of claim 1, further comprising a link reset input configured to receive a link reset signal, and wherein the control circuit is configured to operate responsive to the link reset signal.

5. The audio processing integrated circuit chip of claim 1, wherein the control circuit is configured to disable the at least one port output circuit for a time interval responsive to power up of the audio processing integrated circuit chip.

6. An audio codec integrated circuit chip comprising:

a digital bus interface circuit configured to receive digital audio signals over a digital communications bus;

a plurality of audio ports configured to be coupled to external audio devices;

audio processing circuitry configured to process the digital audio signals received by the digital bus interface circuit to produce processed audio signals;

a plurality of port output circuits configured to generate audio signals at the audio ports responsive to the processed audio signals;

a PC beep circuit configured to receive a PC beep signal from the host and to drive at least one of the port output circuits responsive to the PC beep signal; and a control circuit configured to detect activity of the PC beep signal and to enable and/or disable the at least one of the port output circuits responsive to the detected activity, the control circuit comprising:

a beep signal sensor circuit configured to compare the PC beep signal to a reference signal to thereby generate a beep sense signal;

an activity detector circuit configured to monitor the beep sense signal and to responsively generate a beep activity detection signal; and a port output control circuit configured to control the at least one port output circuit responsive to the beep activity detection signal.

7. The audio codec integrated circuit chip of claim 6, wherein the control circuit is configured to enable and/or disable the at least one of the port output circuits responsive to the detected activity meeting a criterion.

8. The audio codec integrated circuit chip of claim 6, further comprising a link reset input configured to receive a link reset signal and wherein the control circuit is configured to operate responsive to the link reset signal.

9. The audio codec integrated circuit chip of claim 6, wherein the control circuit is configured to disable the at least one of the port output circuits for a time interval responsive to power up of the audio processing integrated circuit chip.

10. An audio processing integrated circuit chip comprising:

at least one port output circuit configured to drive an external audio device;

a PC beep circuit configured to receive a PC beep signal and drive the at least one port output circuit responsive to the PC beep signal; and a control circuit configured to determine whether activity at an input of the PC beep circuit meets a criterion and to responsively control power consumption by the audio processing integrated circuit chip, the control circuit comprising:

a beep signal sensor circuit configured to compare the PC beep signal to a reference signal to thereby generate a beep sense signal;

an activity detector circuit configured to monitor the beep sense signal and to responsively generate a beep activity detection signal; and a port output control circuit configured to control the at least one port output circuit responsive to the beep activity detection signal.

11. The audio processing integrated circuit chip of claim 10, further comprising a link reset input configured to receive a link reset signal and wherein the control circuit is configured to operate responsive to the link reset signal.

12. The audio processing integrated circuit chip of claim 10, wherein the control circuit is configured to disable the at least one port output circuit for a time interval responsive to power up of the audio processing integrated circuit chip.

* * * * *